Patented Sept. 6, 1932

1,876,366

UNITED STATES PATENT OFFICE

OTTO UNGNADE, OF MASON, MICHIGAN, ASSIGNOR TO S. M. A. CORPORATION, OF CLEVELAND, OHIO, A CORPORATION OF OHIO

MANUFACTURE OF CITRATES AND CITRIC ACID

No Drawing. Application filed December 8, 1930. Serial No. 500,878.

This invention relates to the manufacture of citrates and citric acid from any materials containing the same, and more particularly to a method for separating citrates or citric acid, in relatively pure form, from mixtures containing magnesium citrate, either alone or as an impurity with other citrates, such as calcium citrate, its object being to provide a method which produces maximum yield, which is simple in practice, which avoids contamination of the citrate or citric acid by magnesium or other salts, and which can be readily adapted for commercial use with materials not now considered suitable for efficient citrate recovery.

In general, citric acid has been recovered from raw products containing the same, such as citrous juices or any other material containing citrates or citric acid, by precipitating calcium citrate therefrom with milk of lime. The precipitate is filtered off, washed and dried, and is then treated with sulfuric acid to form calcium sulfate as a precipitate, which is filtered off from the filtrate containing citric acid, the filtrate being evaporated to crystallization. Special precautions have always been necessary to prevent contamination of the citric acid with magnesium salts, because even a small amount of magnesium results in considerable loss of citric acid by the formation of magnesium citrates and the consequent production of magnesium sulfate on the addition of sulfuric acid. The high solubility of magnesium sulfate as compared with calcium sulfate leaves it in the filtrate, where its presence disturbs the crystallization of citric acid and tends to result in crystallization of citric acid along with magnesium sulfate, with practically an impossibility of separating the magnesium sulfate from the citric acid by washing or other steps. Prior practice therefore has practically always required the use of a very pure lime containing a high percentage of calcium and not more than a slight trace of magnesium, and has been inapplicable to citrate containing raw materials when appreciable amounts of magnesium salts were present.

According to my invention, I am able to disregard, practically entirely, the matter of magnesium content of either the lime employed for precipitation or of the original raw material, so that materials which contain even as high as 20% or more of magnesium salts are capable of treatment for essentially complete recovery of the citric acid therefrom. I have even applied the invention to raw materials containing as much as 26% or more of magnesium citrate. For this purpose I find it necessary or desirable to dissolve the mixture of magnesium and other citrates, either a raw material containing such citrates or one which has been precipitated by the use of lime containing magnesium, in an acid which is capable of yielding water-soluble salts with alkaline earth metals, and then to neutralize the resulting solution with an earth alkali whose citrate is less soluble than magnesium sulfate and which yields an insoluble sulfate with sulfuric acid. A suitable acid for the purpose is hydrochloric acid, although other acids suitable for the purpose will readily occur to those skilled in the art. Hydrochloric acid yields chlorides of alkaline earth metals which are quite soluble in water. The solution may be neutralized with an earth alkali such as calcium carbonate or calcium hydroxide, which materials are suitable because calcium citrate is less soluble than magnesium citrate and with sulfuric acid yields insoluble calcium sulfate. As a result, assuming that calcium carbonate is used for neutralization to the proper point, there will be enough calcium ions present to convert all magnesium citrate into calcium citrate, and the magnesium salt of the acid used, such as hydrochloric acid, will remain in solution and will not contaminate the calcium citrate.

For example, I have carried out my process in connection with one raw material having approximately the following composition:

| | Per cent |
|---|---|
| Calcium citrate | 67 |
| Magnesium citrate | 26 |
| Albumin | 2 |
| Calcium phosphate | 1 |
| Moisture | 4 |
| Total | 100 |

This material was dissolved in hydrochloric acid and the insoluble residue (largely proteins) was filtered off. The moderately hot solution was then neutralized with the calculated amount of any suitable form of calcium carbonate, even commercial material containing some magnesium, and neutralization was carried on to the point of leaving residual acidity amounting to 0.3% to 0.5% free hydrochloric acid. At this stage all citric acid in the solution was in the form of calcium citrate, accompanied by all of the magnesium in the form of magnesium chloride and with calcium chloride. Neutralization is purposely slightly short of completion to avoid as much as possible contamination of the calcium citrate with excess of calcium carbonate.

On permitting the foregoing solution to stand, calcium citrate crystallizes therefrom almost completely and in a state of great purity. Boiling the solution causes immediate precipitation of calcium citrate. In either case the calcium citrate is quite pure, is not contaminated with any other substance and can be washed to free it from surface impurity from the solution. The product contains no magnesium citrate and is of sufficient purity for use wherever calcium citrate is desirable.

This product may readily be converted into very pure citric acid or into any other citrate salts, by proceeding according to any desired process. For example, the calcium citrate may be dissolved or permitted to react with a proper quantity of sulfuric acid, thereby forming calcium sulfate and citric acid. The calcium sulfate of course is removed as a precipitate, leaving the citric acid in a state of great purity. If the calcium citrate is converted into citric acid, as described, the presence of excess calcium carbonate as a neutralizing agent is unimportant, except that such excess of calcium carbonate of course requires a little more sulfuric acid for conversion and without increasing the citric acid yield.

The process described is applicable to any material which contains mixtures of calcium and magnesium citrates, or to any process for the recovery of citrates or citric acid in which mixtures of calcium and magnesium citrates are produced, making such materials available as raw materials for the manufacture of citrates and citric acid, where they have heretofore been unsuitable for the purpose.

What I claim is:

1. The method of producing megnesium-free citrate from a citrate-containing raw material when magnesium is present, consisting in dissolving the material in an acid which yields a water soluble salt with alkaline earth metals, neutralizing the resulting solution with an earth alkali whose citrate is less soluble than magnesium citrate, and separating the citrate of such earth alkali from the solution.

2. The method of producing magnesium-free citric acid from a citrate-containing raw material when magnesium is present, consisting in preciptating calcium and magnesium citrates from such material, dissolving the precipitate in an acid capable of yielding a water soluble salt with an alkaline earth metal, neutralizing the resulting solution with an earth alkali whose citrate is less soluble than magnesium citrate, separating the citrate of such earth alkali from the solution, and treating the same with sulfuric acid to form and precipitate a sulfate of such earth alkali, leaving citric acid in the solution containing such precipitate.

3. A method of producing calcium citrate from a mixture containing both calcium and magnesium citrates, consisting in dissolving the mixture of calcium and magnesium citrates in an acid capable of yielding a water soluble salt with lime, neutralizing the resulting solution with lime, and separating calcium citrate from the neutralized solution.

4. A method of producing calcium citrate from mixtures containing both calcium and magnesium citrates, consisting in dissolving the mixture in hydrochrloric acid, neutralizing the solution with lime, and crystallizing the calcium citrate from such solution.

In testimony whereof I hereby affix my signature.

OTTO UNGNADE.